United States Patent

Brilliant

[11] Patent Number: 5,224,248
[45] Date of Patent: Jul. 6, 1993

[54] ATTACHING A TEMPLE TO AN EYEWIRE OF AN EYEGLASS FRAME

[76] Inventor: Jo A. Brilliant, 7050-201 Harbour Village Ct., Annapolis, Md. 21403

[21] Appl. No.: 832,320

[22] Filed: Feb. 7, 1992

[51] Int. Cl.⁵ .................. B21D 33/00; G02C 5/22
[52] U.S. Cl. .................................. 29/20; 29/436; 29/437; 29/525; 29/525.1; 411/512; 24/580; 16/228
[58] Field of Search .............. 411/500, 512; 24/572, 24/580; 16/228; 29/20, 434, 436, 437, 525, 521

[56] References Cited

U.S. PATENT DOCUMENTS

| | | | |
|---|---|---|---|
| 908,737 | 1/1909 | Broughton | 411/500 X |
| 1,352,552 | 9/1920 | Smith . | |
| 1,415,659 | 5/1922 | Lawlor . | |
| 1,567,192 | 12/1925 | Richardson . | |
| 2,120,530 | 6/1938 | Shippee et al. | 411/500 X |
| 2,332,261 | 10/1943 | Rohrback . | |
| 3,110,057 | 11/1963 | Urich | 16/228 |
| 3,264,678 | 8/1966 | Parmelee | 16/228 |
| 3,349,430 | 10/1967 | Rosenvold et al. | 16/228 X |
| 3,516,699 | 6/1970 | Bergere | 411/500 X |
| 3,826,565 | 7/1974 | Wenzel | 351/121 |
| 4,256,388 | 3/1981 | Beyer | 16/228 X |
| 4,428,094 | 1/1984 | Emain | 16/228 |

Primary Examiner—Timothy V. Eley
Attorney, Agent, or Firm—Robert M. Schwartz; Edward I. Mates

[57] ABSTRACT

A fastening device for attaching a temple to an eyewire of an eyeglass frame, a method of fastening using the fastening device and apparatus for impelling an elongated pin forming part of the fastening device. The fastening device is so constructed and arranged to insert an elongated pin through aligned hinge barrels of a hinge to be connected with its pointed end received unit a backing member. A gun-like member is used for inserting an elongated pin having a head at one end and a pointed tip portion at its other end and a circumferential groove adjacent the pointed tip portion. The elongated pin is so constructed and arranged the backing member that receives the pointed tip portion and the circumferential groove of the elongated pin therewithin when the enlarged head of the elongated pin is fully inserted through aligned hinge barrels and into the backing member. The backing member is preferably of distortable material so that it can distort within the circumferential recess when the pin is driven into the backing member. The resulting hinge avoids rough ends of prior art fastening devices.

10 Claims, 1 Drawing Sheet

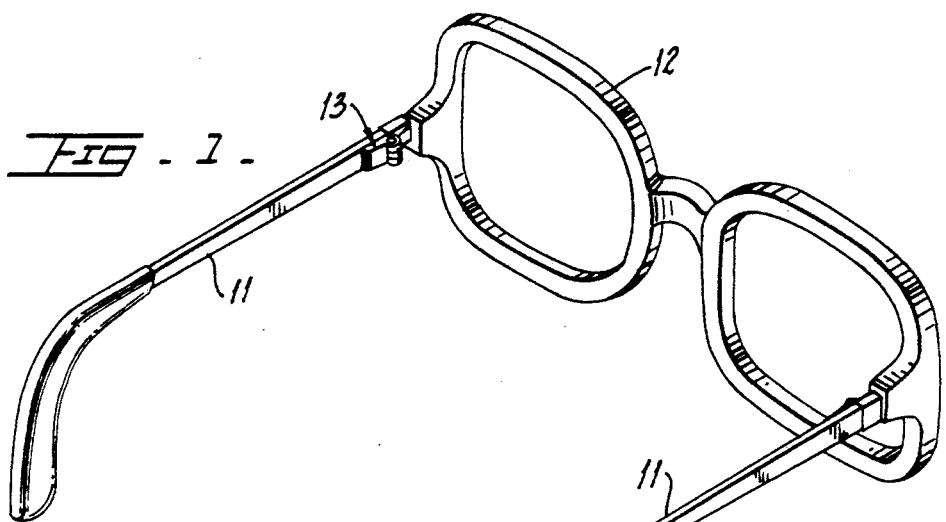
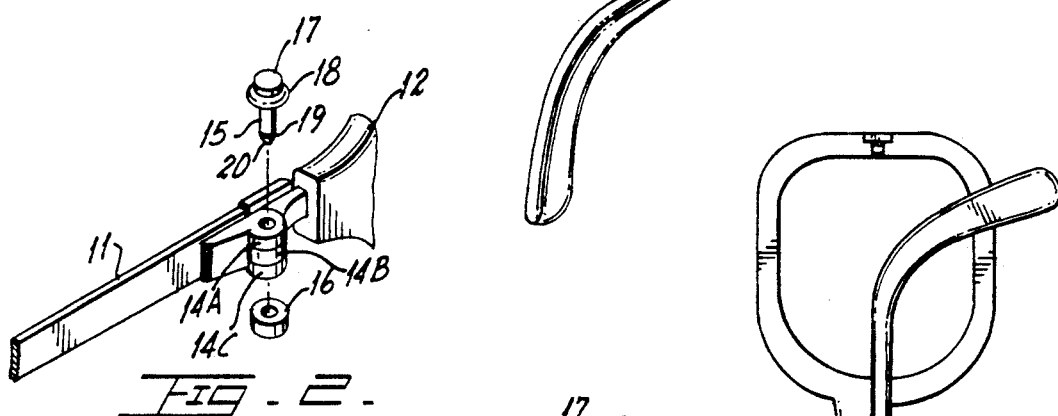
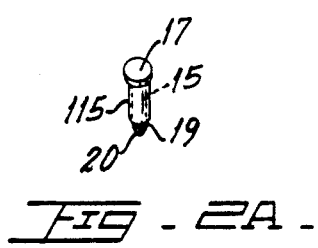
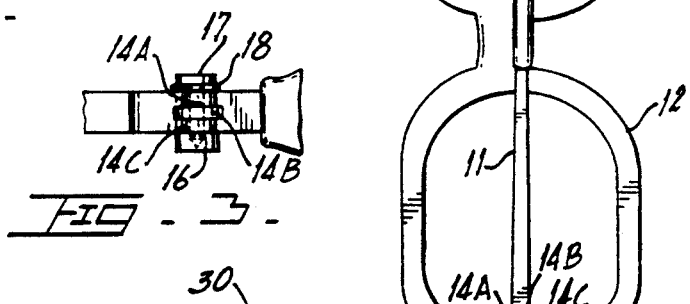
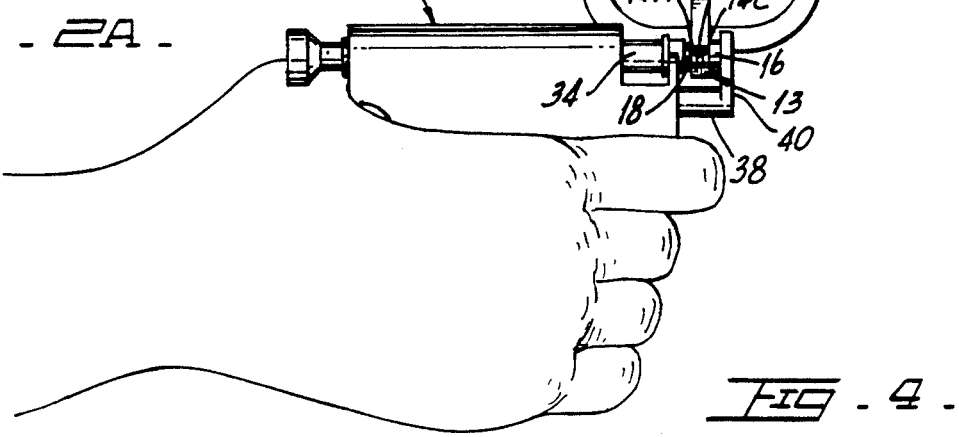

5,224,248

ATTACHING A TEMPLE TO AN EYEWIRE OF AN EYEGLASS FRAME

BACKGROUND OF THE INVENTION

This invention relates to attaching a temple to an eyewire of an eyeglass frame and covers a hinge pin such as used in connecting the temple members of a pair of spectacles to the eyeglass frame, a method of applying an elongated hinge pin to pivotally attach a temple to an eyewire of the eyeglass frame and apparatus to accomplish this attachment.

Hinges used to pivotally attach a temple to an eyewire of spectacles comprise a plurality of barrel sections on each hinge member. These sections are positioned in mating relationship with the hinge barrels of each member alternating. The hinge members are attached respectively to the temple and the eyewire of an eyeglass frame. Each of the hinge barrel members has a bore. In a mating position these bores are aligned so that a hinge pin can be inserted therethrough. In the past, hinge pins have had a portion of their shank threaded and the threaded portion would mate with the threaded bore of one or more of the hinge barrels to secure the different hinge barrel sections together.

Prior to this invention, the operation of connecting the temple to the eyewire was performed manually with a screwdriver or pliers or other very small hardware to assemble screws, washers and/or nuts of very small dimensions. The hinge barrel members aligned with one another in alternating relation were penetrated by an elongated pin which had an enlarged slotted head at one end to receive a screwdriver and extended beyond the other end of the aligned hinge barrel members to form an externally threaded end. After screwing a nut around the threaded end to abut one end of the aligned hinge barrel members to tighten the enlarged head to the other end of the aligned hinge barrel members, an excess length of the elongated pin remained. The excess was cut off from the remainder of the pin. Such an apparatus is cumbersome as the assembly and repair functions are awkward due to the need of extreme manual dexterity in the handling required for assembling such small pieces.

SUMMARY OF THE PRIOR ART

Typical examples of tools used by opticians in the past include U.S. Pat. No. 1,352,552 to Louis R. Smith, patented Sep. 14, 1920; U.S. Pat. No. 1,415,659 to James M. Lawlor, patented May 9, 1922; and U.S. Pat. No. 1,567,192 to Reed D. Richardson, patented Dec. 29, 1925. These three patents are mentioned, not because they are particularly relevant to the present invention, but because they depict the state of the art for many years.

U.S. Pat. No. 2,332,261 to John J. Rohrbach, issued Oct. 19, 1943, discloses a method of securing lenses in ophthalmic mountings which utilizes a hollow solder bushing and electric power to heat and soften the solder to prepare an opening in a glass lens aligned with openings in a lens strap to help secure a metal mounting to and around a lens. A special awl is utilized to tighten a screw within the solder bushing. The screw is longer than the total thickness of the lens and its mounting so that it is necessary to remove an excess portion of the length of the screw after the attachment is made. Even after the excess portion is removed, the exposed cut end of the screw can scratch a person handling the eyeglasses. Such scratching is annoying. Also, the raw cut end is not esthetically acceptable as the eyeglasses so assembled appear rough and unfinished.

U.S. Pat. No. 3,826,565 to Ronald Arthur Wenzel, issued Jul. 30, 1974, uses a hinge pin made of plastic material that is pressed downwardly through aligned bores of barrel members of the hinge to secure the mating hinge barrel members in an interleaved position. This patent eliminates threaded grooves on the outer surface of the hinge pin so that it eliminates the previously required hand screwing of the hinge pin to a nut.

The hinge pin in the Wenzel patent has an elongated body with an enlarged head at one end and a pointed tip at its opposite end. The hinge pin is considerably longer than the thickness of the interleaving barrel members. A barb is formed on a lead portion of the elongated pin to extend outwardly after a tip has passed through the entire thickness of the mated barrel members. The elongated pin has to be sufficiently thinner than the holes which align through the thickness of the aligned barrel members to enable the barb formed on the lead portion of the elongated pin to extend transversely of the axis of the lead portion outwardly beyond the outer surface of a relieved section of the pin.

The hinge pin is inserted through the aligned bores of the mated hinge barrel portions, and the lead portion of the elongated pin extends downwardly through the aligned hinge barrels. A tool grips the tip of the Wenzel patent and pulls it downwardly until the transversely extending barb has passed beneath the bottom of the lowermost hinge barrel. The barb causes the lead portion of the pin to shift laterally as the head of the pin seats in the counter-bored section of the top barrel of the hinge. This lateral shifting causes the barb to be positioned so that it is caught beneath the surface of the lowermost hinge barrel and maintains the pin securely in position with an excess portion extending beyond the aligned hinge barrels.

It is then necessary to remove the excess portion of the elongated pin by cutting or breaking it off. This removal step is not only time consuming, but wasteful of material.

SUMMARY OF THE INVENTION

This invention comprises a fastening device for attaching a temple to an eyewire of an eyeglass frame and comprises an elongated pin having an enlarged portion at one end, a pointed tip portion at its other end, and a circumferential groove in a plane normal to the longitudinal axis of the pin adjacent the pointed tip portion. The elongated pin has a main portion of uniform diameter from its head portion to the circumferential groove of sufficient length to extend through a plurality of aligned interleaving hinge barrels extending alternately from the temple and the eyewire. The hinge barrels in the main portion are constructed and arranged so that the main portion of the elongated pin fits snugly and slidably through the hinge barrels when the latter are aligned. A deformable backing member aligned with the aligned hinge barrels is constructed and arranged so that the circumferential groove and the tip portion of the elongated pin are embedded within the backing member when the enlarged head portion engages one of the hinge barrels at one end of said plurality of hinge barrels and the deformable backing member abuts another of said aligned hinge barrels at the other end of said plurality of hinge barrels. The total length of the elongated pin from its enlarged head portion through its tip portion does not exceed and is preferably slightly less than the total thickness of the aligned hinge barrels and the abutting backing member. The enlarged head portion abuts an outer surface of a hinge barrel at one end of the aligned hinge barrels and the pointed tip portion and circumferential groove are embedded within the backing member that abuts the other end of the aligned hinge barrels. The pin is more rigid than the deformable backing member so that the latter deforms into the circumferential groove of the pin when said pointed tip portion penetrates said backing member.

This invention makes it unnecessary to provide a pin of excessive length that has to be pulled through the aligned hinge barrels with a hand tool, then locked in place by securing a portion of the pin beyond the other end of the aligned hinge barrels and removing the excess length of the elongated pin. Therefore, eyeglasses assembled with the fastening device of this invention are free of rough edges that are likely to scratch a person handling the eyeglasses. Also, the backing member that receives the pointed end of the elongated pin has a finish that is esthetically superior to the raw cut edges of prior art devices.

A particularly preferred method of installing the fastening device for attaching the temple and the eyewire involves installing one or more elongated pins in a cartridge case holder, supporting the holder in front of an elongated barrel of a gun-like member provided with a carrier tray constructed and arranged beyond said elongated barrel in alignment therewith to support said plurality of aligned hinge barrels between means for supporting said backing member and said cartridge case holder supporting a selected elongated pin in front of said elongated barrel. The means for supporting the backing member is attached to the carrier tray and supports the backing member in alignment with the elongated barrel and the bores of the aligned hinge barrels axially aligned therebetween when the aligned hinge barrels are mounted on said carrier tray. Discharging the gun-like member imparts an elongated pin from the cartridge case holder through the aligned bores of the aligned hinge members supported on said carrier tray and into the backing member so that the pointed end portion and circumferential groove of the elongated pin become firmly embedded within the backing member while the enlarged head portion engages an outer end hinge barrel of the aligned hinge barrels. The backing member extends axially a short distance beyond an opposite outer end hinge barrel to receive the circumferential groove within the backing member in close adjacency to the opposite outer end hinge barrel.

DESCRIPTION OF THE DRAWINGS

In the drawings that form part of the description of a preferred embodiment of this invention and wherein like numbers refer to like structural elements, FIG. 1 is a perspective view of a pair of glasses showing a temple secured to an eyewire of an eyeglass frame using the device of this invention.

FIG. 2 is an exploded enlarged view of a portion of FIG. 1, showing the elements of the hinge separated from one another prior to their assembly.

FIG. 2A is a perspective view of an alternate embodiment of an elongated pin forming one of the elements of the FIG. 2 hinge.

FIG. 3 is an elevational further enlarged view of a single elongated pin showing its detailed construction engaging a series of aligned hinge barrels with an enlarged head portion engaging one end of said hinge barrels and a circumferential groove and a pointed tip portion embedded in fixed relation within a backing member after the elements have been assembled.

FIG. 4 is an elevational view of a temple and an eyewire portion supported by a gun-like member used to impel an elongated pin through a plurality of aligned hinge barrels of a hinge and into a backing member to convert a series of hinge elements into a finished hinge, omitting optional cartridge that may serve as a device for automatically feeding one elongated pin at a time into position to be impelled each time a different hinge is finished.

DESCRIPTION OF PREFERRED EMBODIMENT

FIG. 1 shows how a temple 11 is attached to an eyewire portion 12 of an eyeglass frame using a hinge 13. With reference to FIG. 2, the elements of a hinge 13 to be connected comprise a series of aligned hinge barrels 14A, 14B, 14C, an elongated pin 15, and a backing member 16. The elongated pin 15 has an essentially uniform diameter from an enlarged head 17 abutting a bushing 18 of compressible material such as rubber to a pointed end 20. Backing member 16 may also be optionally provided with a bushing (not shown) facing an end hinge barrel 14C opposite the end hinge barrel 14A adjacent enlarged head 17. The elongated pin 15 has a circumferential groove 19 in a plane normal to the longitudinal axis of elongated pin 15 adjacent its pointed tip 20. FIG. 3 also shows the position occupied by backing member 16 relative to aligned hinge barrels 14A-14C and elongated pin 15 when the latter is fully inserted with circumferential groove 19 and pointed tip portion 20 embedded completely within backing member 16 and not extending therebeyond. Elongated pin 15 is constructed and arranged so that its entire length does not exceed the total thickness of the aligned hinge barrels 14A-14C and backing member 16 when the elongated pin 15 is fully inserted through the aligned bores in the hinge barrels with enlarged head 17 and its abutting bushing 18 forced against an endmost hinge barrel 14A and circumferential groove 19 and pointed end portion 20 embedded within backing member 16. While only three hinge members are illustrated, it is understood that any number of interfitting hinge members extending alternatively from reinforcements on temples 11 and reinforcements for eyewire portion 12 may be used.

Bushing 18 compressed between hinge barrel 14A and the enlarged head 17 and surrounding the elongated pin 15 adjacent the enlarged head 17 and optional bushing 18 compressed against the portion of backing member 16 that faces the opposite end of hinge barrel 14C of the plurality of aligned hinge barrels from the end hinge barrel 14A that faces the enlarged head 17 provide a tight axial fit for the elongated pin 15 between hinge barrel 14A and backing member 16. The combination of pointed tip 20 and circumferential groove 19 and the construction and arrangement of the axial lengths of elongated pin 15, hinge barrels 14 and backing member 16 enable the pin to be completely embedded without extending beyond the thickness of the backing member 16. At the same time, the hinge barrels are free to rotate about elongated pins 15 when the eyeglasses are assembled in a manner to be described.

FIG. 2A shows an alternate construction of elongated pin 15 in which pin 15 is enclosed within an elongated rubber gasket 115 for substantially its entire length.

A gun-like member 30 similar to a gun used for ear piercing and having an elongated barrel 34 defining a longitudinal axis and constructed and arranged to be loaded and discharged to impel an elongated pin 15 along said longitudinal axis has a carrier tray 38 aligned in front of elongated barrel 34. Carrier tray 38 extends beyond the discharge opening of the elongated barrel 34 and is constructed and arranged to support the hinge barrels of hinge 13 in proper alignment along said longitudinal axis. Carrier tray 38 terminates in an end wall comprising a backing member holder 40 which supports a replaceable backing member 16 along said longitudinal axis. A pin-receiving slot (not shown) is provided for elongated barrel 34 to insert a pin therein in alignment with backing member holder 40 along said longitudinal axis so that gun-like member 30 impels an elongated pin 15 from barrel 34 through the bores of the aligned hinge barrels and into backing member 16.

A cartridge case (not shown) may be provided with a plurality of stations, each having a separate elongated pin 15 so that it is possible to change the pin receiving station after a pin 15 is discharged without replacing the cartridge case. Then a completed hinge 13 is removed with elongated pin 15 and another backing member 16 attached to holder 40. Another set of aligned hinge barrels of a temple and an eyeframe are mounted on carrier tray 38, the cartridge case is either adjusted to expose another pin in another pin receiving station or replaced with another cartridge case on the cartridge case holder. Preferably, the cartridge case is of cylindrical construction with a series of longitudinal holes serving as pin receiving stations that are selectively aligned along said longitudinal axis by rotatably mounting said cartridge case about an axis offset to and parallel to said longitudinal axis.

Carrier tray 38 now supports the elements of the next hinge 13 to be connected. Said next hinge comprises a plurality of hinge barrels 14A, 14C, etc. extending from temple 11 interfitted with hinge barrels 14B etc. extending from eyewire portion 12 adjacent the point where the cartridge case holder, if used, supports the cartridge case. The bores through the aligned hinge barrels are aligned between the pin-receiving station occupied by a successive elongated pin 15 within the cartridge case and the center of a backing member 16 supported on backing member holder 40. Thus, each time the gun is triggered, a different elongated pin 15 is impelled through a different set of aligned bores of hinge barrels 14A, 14B, 14C to embed its pointed tip 20 and circumferential groove 19 within the thickness of backing member 16, which is compressed before gun-like member 30 is fired. The backing member 16 deforms within circumferential groove 19 to ensure a tight fit of backing member 16 within circumferential groove 19. Backing member 16 is preferably composed of a soft, deformable material, such as rubber or plastic, that enables it to deform into the circumferential groove maintained when elongated pin 15 is driven into backing member 16.

Any kind of hinge barrel support member that fits on carrier tray 38 may be used, particularly one that permits a succeeding elongated pin 15 to come into place at the pinreceiving station beyond the discharge opening of elongated barrel 34 in alignment with the aligned bores of a set of hinge barrels supported on carrier tray 38 between the opening of barrel 34 and a backing member 16 supported on a relatively rigid backing member holder 40. With the cartridge case structure, it may be necessary periodically to replace a cartridge case whenever the elongated pins 15 therewithin have been depleted. This may be done by hand, although it is also contemplated to use a second cartridge (not shown) constructed and arranged to feed one backing member 16 at a time to holder 40 instead of doing so by hand. Without a cartridge case, gun-like member 30 can be readily loaded with an elongated pin by hand whenever a hinge is to be connected in a manner generally used in earlobe piercing guns.

It is understood that different eyeglass manufacturers use eyeglasses having different hinge structures comprising hinge barrels of different dimensions and number other than three. Five and seven hinge barrels are used frequently in hinge structures. It is not necessary to furnish a different gun for each different pin size required. It is within the gist of this invention to provide cartridge cases having pin receiving stations of different length and radius to accommodate elongated attachment pins of different lengths and thicknesses. It is preferred that a unique cartridge case be provided for each variation of pin size required. Proper labeling or other means of identification as to size is recommended for each cartridge case specifying the unique dimensions of pin size.

Conforming to the provisions of the patent statutes, applicant has provided an explanation of the principle, preferred construction and mode of operation of this invention and has illustrated and described what is now considered to be its best embodiment. It is understood, however, that within the scope of the claimed subject matter that follows, the invention may be practiced otherwise than as specifically illustrated and described.

What is claimed is:

1. A method of attaching a temple to an eyewire of an eyepiece comprising axially aligning a plurality of hinge barrels extending alternately form said temple and said eyewire between an elongated pin having an enlarged head portion at one axial end, a pointed tip portion at its other axial end facing one end of said aligned hinge barrels, and a circumferential groove in a plane normal to the axis of said elongated pin adjacent a pointed tip of said pointed tip portion, and a deformable backing member facing an opposite end of said aligned hinge barrels, selecting an elongated pin and a backing member so constructed and arranged that said elongated point can be inserted to fit snugly and slidably through said aligned hinge barrels until said enlarged head portion engages one of said aligned hinge barrels at one axial end thereof and said pointed tip portion and said circumferential groove penetrate within the thickness of said backing member and cause the latter to distort into said circumferential groove when the latter abuts said opposite end of said aligned hinge barrels at the other axial end thereof, and impelling said elongated pin through said aligned plurality of hinge barrels and into said deformable backing member until said enlarged head portion engages said one hinge barrel while said backing member engages said opposite hinge barrel and said pointed tip portion and said circumferential groove are embedded within said backing member, whereby it is unnecessary to provide a pin of excessive length that has to be pulled through said aligned hinge barrels with a hand tool, then locked in place by securing a portion of said pin beyond said opposite end of said aligned hinge barrels to said another of said hinge barrels and removing the excessive length of said elongated pin.

2. A method as in claim 1, wherein said elongated pin is impelled through an elongated barrel of a gun-like member provided with a carrier tray constructed and arranged to support said plurality of aligned hinge barrels in alignment between means for supporting said deformable backing member and said elongated barrel.

3. A method as in claim 1, further including supporting said deformable backing member against said opposite hinge barrel so that said deforming backing member distorts into said circumferential recess when said pointed extremity of said elongated pin is driven thereinto.

4. A fastening device for attaching a temple to an eyewire of an eyeglass frame comprising an elongated pin having a longitudinal axis, an enlarged head portion at one axial end of said elongated pin, a pointed tip portion at its other axial end, and a circumferential groove in a plane normal to said axis adjacent a pointed tip of said pointed tip portion, said elongated pin having a main portion of essentially uniform diameter from said head portion to said circumferential groove to extend through a plurality of axially aligned interleaving hinge barrels extending alternately from said temple and said eyewire, said main portion being constructed and arranged so that said main portion fits snugly and slidably through said hinge barrels when the latter are aligned, a deformable backing member aligned with said aligned hinge barrels and constructed and arranged so that said circumferential groove and said tip portion are embedded within said backing member when said enlarged head portion engages one of said hinge barrels at one axial end of said plurality of hinge barrels and said backing member engages another of said hinge barrels at an opposite axial end of said plurality of hinge barrels, said deformable member being composed of deformable material capable of distorting into said circumferential groove when said grooved pointed tip portion of said elongated pin is driven into said backing member.

5. A fastening device as in claim 4, further comprising a compressible, resilient bushing surrounding said elongated pin adjacent said enlarged head.

6. A fastening device as in claim 5, wherein another bushing is interposed between said backing member and said another of said hinge barrels.

7. A fastening device as in claim 5, wherein said bushing is interposed between said enlarged head and said one of said hinge barrels when said temple is attached to said eyewire.

8. A fastening device as in claim 4, further including an elongated rubber gasket surrounding said main portion of said elongated pin.

9. A fastening device as in claim 4, for use in pivotally attaching a temple to an eyewire of an eyeglass frame wherein said plurality of interleaving hinge barrels extending alternatively from said temple and said eyewire have a total given thickness when axially aligned, said elongated pin having an axial length from said enlarged head portion to said circumferential groove that is slightly longer than said total given thickness and an axial length from said enlarged head portion to said other axial end that is less than the sum of said total given thickness plus the thickness of said deformable backing member, whereby said grooved pointed tip portion is embedded within said deformable backing member when driven thereinto through said axially aligned interleaving hinge barrels until said enlarged head portion engages an outer surface of said one of said hinge barrels at said one axial end of said plurality of hinge barrels.

10. A fastening device as in claim 9, further including backing member support means constructed and arranged to support said deformable backing member when said elongated pin is inserted through said aligned hinge barrels and embedded within said deformable backing member.

* * * * *